(12) United States Patent
Farone et al.

(10) Patent No.: US 8,802,049 B2
(45) Date of Patent: Aug. 12, 2014

(54) METHODS OF PRODUCING METALLIC PEROXIDE COMPOSITIONS FOR USE IN GROUNDWATER DECONTAMINATION

(75) Inventors: William Farone, Irvine, CA (US); Benjamin V. Mork, Newort Beach, CA (US); Tracy Palmer, Temecula, CA (US)

(73) Assignee: Regenesis Bioremediation Products, San Clemente, CA (US)

( * ) Notice: Subject to any disclaimer, the term of this patent is extended or adjusted under 35 U.S.C. 154(b) by 751 days.

(21) Appl. No.: 12/939,357

(22) Filed: Nov. 4, 2010

(65) Prior Publication Data

US 2012/0112128 A1   May 10, 2012

(51) Int. Cl.
| | |
|---|---|
| C01B 15/04 | (2006.01) |
| C09K 3/00 | (2006.01) |
| C02F 1/72 | (2006.01) |
| C02F 1/68 | (2006.01) |
| C02F 3/02 | (2006.01) |
| A62D 3/02 | (2007.01) |
| B09C 1/08 | (2006.01) |
| B09C 1/10 | (2006.01) |

(52) U.S. Cl.
USPC .................. 423/583; 210/747.8; 252/182.32; 405/128.45; 405/128.5

(58) Field of Classification Search
USPC .............................. 423/583; 210/747.7, 747.8
See application file for complete search history.

(56) References Cited

U.S. PATENT DOCUMENTS

| | | | | |
|---|---|---|---|---|
| 2,695,217 | A | * | 11/1954 | Dunlop et al. ................ 423/583 |
| 5,264,018 | A | * | 11/1993 | Koenigsberg et al. ........... 71/63 |
| 5,395,419 | A | | 3/1995 | Farone et al. |
| 7,160,471 | B2 | | 1/2007 | Looney et al. |
| 2006/0088498 | A1 | | 4/2006 | Martin et al. |
| 2008/0125334 | A1 | | 5/2008 | Burns et al. |

OTHER PUBLICATIONS

Patent Cooperation Treaty International Search Report; PCT/US2011/058388; mailed Feb. 17, 2012; 6 pages.

\* cited by examiner

*Primary Examiner* — Peter F Godenschwager
(74) *Attorney, Agent, or Firm* — Stetina Brunda Garred & Brucker

(57) ABSTRACT

An improved and efficient method of producing a composition containing a metal peroxide capable of enhancing microbial degradation of contaminants in soil and groundwater. The method includes reacting a metal oxide or metal hydroxide with hydrogen peroxide in a solution of water containing a reaction moderator, intercalation agent, and a gelling agent.

19 Claims, No Drawings

METHODS OF PRODUCING METALLIC PEROXIDE COMPOSITIONS FOR USE IN GROUNDWATER DECONTAMINATION

CROSS-REFERENCE TO RELATED APPLICATIONS

Not Applicable

STATEMENT RE: FEDERALLY SPONSORED RESEARCH/DEVELOPMENT

Not Applicable

BACKGROUND

Metallic peroxides, mainly of the alkaline earth metals calcium and magnesium, have been used to assist microbial degradation of contaminants in soil and groundwater by aerobic processes by slowly releasing oxygen. Prior versions of these materials and methods of their use were described in U.S. Pat. Nos. 5,264,018 and 5,395,419, which the entireties of both are herein incorporated by reference. Typically, these materials are formed by the reaction of hydrogen peroxide with either calcium or magnesium oxides or hydroxides. These materials are then used to release oxygen slowly into the groundwater such that microbes can use the oxygen for the aerobic biodegradation of hydrocarbons such as benzene, toluene, ethyl benzenes, and xylenes (frequently referred to as BTEX when they are in a mixture). BTEX can be an extremely difficult contaminant to remove from a site.

The existing products, however, have certain inefficiencies. For example, the prior art materials require cooling while they are being manufactured. Furthermore, they require the use of excess hydrogen peroxide because the generated heat decomposes the peroxide before it can react. The cooling is achieved by using excess water to mediate the reaction. The water is then removed in an energy intensive step of spray drying. Spray drying is not only energy intensive but also produces fine powders that require expensive air pollution abatement equipment to mitigate the powders escaping into the environment. The slurry formed from the prior methods is usually in the 20-25% solids range, thereby requiring the removal of three to four times the weight of the product by drying. Ironically, the application of the product to contaminated ground water is performed by slurry injection. As such, the material is once again mixed with water in order to be injected into the ground.

BRIEF SUMMARY

The present invention seeks to overcome some of the inefficiencies present in the prior art methods. In particular, the methods of the present invention allow for the elimination of the need for drying. A stable product containing metal peroxides is achieved in gel or slurry form, which can then be injected into the ground without the need to remove excess water in a spray drying process. Optionally, additional water may be added to the product at the time of injection to achieve the desired consistency. Since the present invention provides additional further benefits over the prior art, one may, however, choose to spray dry the resulting composition if so desired. Another benefit of the present invention is the use of minimal excess hydrogen peroxide in the reaction by controlling the reaction rate of hydrogen peroxide to make the metallic peroxides. The prior art controlled the rate of release of the oxygen from the metal peroxide reacting with water by infusing a phosphate salt into the crystal structure of the metal during manufacture and drying. The phosphate acts as an intercalating agent to reduce the catalytic effect of metal ions on decomposing hydrogen peroxide by chelating the metal ions, thereby slowing the reaction rate. However, in practice, the phosphate itself is inadequate to control the reaction. Too much heat is given off, even in the presence of the phosphate, resulting in a continued need to cool the reaction.

The present invention provides compositions and methods of producing compositions capable of enhancing microbial degradation of contaminants in soil and groundwater. One embodiment of the present invention includes a method of producing a composition wherein a metal oxide or metal hydroxide is reacted with hydrogen peroxide in a solution of water containing a reaction moderator, intercalation agent, and a gelling agent. These reaction components and their relative weight percentages are summarized below in Table 1.

TABLE 1

| Component | Weight Percentage |
|---|---|
| Metal oxide or metal hydroxide | 20-30 |
| Hydrogen peroxide | 10-15 |
| Reaction moderator | 0.5-5 |
| Intercalation agent | 0.5-5 |
| Gelling agent | 1-20 |
| Water | 40-70 |

In contrast to the prior art, the methods of the present invention allow one to control both the rate of reaction to make the metallic peroxides, as well as the rate of subsequent oxygen release when further exposed to water. Examples of suitable metal oxides for use in the present invention include CaO and MgO, while examples of suitable metal hydroxides include $Ca(OH)_2$ and $Mg(OH)_2$. The "reaction moderator" is a substance that reacts with the hydrogen peroxide itself but does not make a peroxide that is as stable as the metallic peroxide, thereby controlling the combined reaction. An example of such a moderator is acetic acid or salts of acetic acid. The acetic acid reacts with the hydrogen peroxide to form peracetic acid. The reaction moderator therefore competes with the metallic oxide or metallic hydroxide to react with the hydrogen peroxide, thereby slowing (i.e., cooling) the metallic oxide or hydroxide reaction.

It has been found that the reaction of the reaction moderator and hydrogen peroxide is less favored in a dilute solution. Accordingly, the additional presence of a gelling agent (or water activity controller) reduces the water activity to promote the reaction of the reaction moderator with the hydrogen peroxide. The gelling agent provides a further benefit of forming the product in a gel or slurry form, which is easily diluted and used for injection at a contaminated site. The gelling agent may be carrageenan, gelatin, ethyl cellulose, methyl cellulose, xanthan gum, or other similar agents.

Examples of suitable reaction moderators include carboxylic acids and their salts. Particularly, the reaction moderator may be acetic acid, formic acid, propionic acid, or higher carboxylic acids. More particularly, the reaction moderator may be sodium acetate. Additionally, the hydrogen peroxide may be in an aqueous solution ranging from about 30% to about 70%, so it initially contains water and is converted to water as the peroxygen transfers to the metallic base material and the peracid. The intercalating agent may be a simple phosphate salt. In particular, the intercalation agent may be $KH_2PO_4$, $K_3PO_4$, $K_2HPO_4$, $NaH_2PO_4$, $Na_3PO_4$, or $Na_2HPO_4$.

Although it is feasible to create a product of the present invention via the use of a reaction moderator without an intercalation agent, or by the use of an intercalating agent without a reaction moderator, the intercalation agent contributes to the longevity of the product while the reaction moderator buffers the reaction. As such, it is preferred to use both components in the formation of the composition. Alternatively, the metal oxide or metal hydroxide can first be reacted with hydrogen peroxide in the presence of a reaction moderator to form a first solution. This first solution may then be reacted with intercalation and/or gelling agents to form a final product. Optionally, the first solution may be dried prior to reacting with the intercalation and/or gelling agents.

The present invention further envisions a composition capable of enhancing microbial degradation of contaminants in soil and groundwater prepared by the disclosed methods. In particular, a composition may be formed by reacting the reagents recited in Table 2.

TABLE 2

| Component | Weight Percentage |
|---|---|
| $Ca(OH)_2$ | 20-30 |
| $H_2O_2$ (30-70% solution) | 10-15 |
| $CH_3COONa$ | 0.5-5 |
| $KH_2PO_4$ | 0.5-5 |
| Carrageenan | 1-20 |
| Water | 40-70 |

Exemplary compositions have been prepared per the disclosure of this invention by reacting the ratios of reagents in the below-listed examples.

Example A

TABLE 3

| Component | Weight Percentage |
|---|---|
| $Ca(OH)_2$ | 25.92 |
| $K_3PO_4$ | 0.78 |
| $CH_3COONa$ | 0.78 |
| $H_2O_2$ | 24.02 |
| Water | 47.47 |
| Carrageenan | 1.03 |

Example B

TABLE 4

| Component | Weight Percentage |
|---|---|
| $Ca(OH)_2$ | 25.51 |
| $K_3PO_4$ | 1.51 |
| $CH_3COONa$ | 1.51 |
| $H_2O_2$ | 23.63 |
| Water | 46.80 |
| Carrageenan | 1.03 |

Example C

TABLE 5

| Component | Weight Percentage |
|---|---|
| $Ca(OH)_2$ | 22.77 |
| $K_3PO_4$ | 1.35 |
| $CH_3COONa$ | 1.35 |
| $H_2O_2$ | 31.63 |
| Water | 41.75 |
| Carrageenan | 1.14 |

Example D

TABLE 6

| Component | Weight Percentage |
|---|---|
| $Ca(OH)_2$ | 23.09 |
| $K_3PO_4$ | 0.69 |
| $CH_3COONa$ | 0.69 |
| $H_2O_2$ | 32.07 |
| Water | 42.33 |
| Carrageenan | 1.13 |

Example E

TABLE 7

| Component | Weight Percentage |
|---|---|
| $Ca(OH)_2$ | 25.92 |
| $K_3PO_4$ | 0.78 |
| $C_2H_5COONa$ | 0.78 |
| $H_2O_2$ | 24.00 |
| Water | 47.49 |
| Carrageenan | 1.03 |

Example F

TABLE 8

| Component | Weight Percentage |
|---|---|
| $Ca(OH)_2$ | 25.83 |
| $K_3PO_4$ | 0.77 |
| $CHOONa$ | 0.81 |
| $H_2O_2$ | 23.89 |
| Water | 47.67 |
| Carrageenan | 1.03 |

DETAILED DESCRIPTION

The detailed description as set forth below is intended as a description of the presently preferred embodiments of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention. For example, the following embodiments of the invention were prepared as examples of the invention's utility; however, variations of the ingredients would also fall within the scope of the invention.

Example 1

A highly smooth gel product was made without the removal of water. To prepare a small amount of the gel, 54.0 grams of calcium hydroxide, $Ca(OH)_2$, was mixed with 1.62 grams of sodium acetate, $CH_3COONa$. Separately, 99 grams of water was placed in vessel with stirring. The mixture of calcium hydroxide and sodium acetate was slowly added to the vessel. The mixture was mixed until a uniform slurry was formed. A total of 50 grams of 50% by weight hydrogen peroxide, $H_2O_2$, was added slowly to the reaction vessel at a rate to maintain the reaction temperature of 40° C. Depending on ambient conditions and the temperature of the reagents, it may be necessary to add heat at the beginning of the reaction and remove heat after the reaction is in progress; if one desires to perform the reaction in the shortest time period, cooling will likely be required during the addition of $H_2O_2$. After the reaction was completed, as evidenced by no further heat generation after the addition of the last amount of $H_2O_2$, 2.11 grams of carrageenan was mixed into the reaction while it was still at 40° C. The resulting product was a smooth, moist mixture similar to thin "dough" with an active oxygen content of 5.7%. Table 3 provides the reaction ingredients by weight percentage.

TABLE 9

Composition Added to the Reactor

| Compound | Percentage |
| --- | --- |
| $Ca(OH)_2$ | 26.12 |
| $H_2O_2$ | 12.09 |
| $CH_3COONa$ | 0.78 |
| Carrageenan | 1.02 |
| Water | 59.98 |

Table 4 provides the product composition based on the active oxygen percentage and the assumption that the mixture reached equilibrium for all of the oxygen that was not lost from the reaction.

TABLE 10

Composition of the Products

| Compound | Percentage |
| --- | --- |
| $Ca(OH)_2O$ | 31.76 |
| $CH_3COONa$ | 0.78 |
| Carrageenan | 1.02 |
| Water | 63.39 |

Example 2

The procedure of Example 1 was followed except for the amount of added carrageenan. In this example, 5.28 grams of carrageenan was added at the end of the reaction while the reactants were still at 40° C. The active oxygen content of this example was found to be 5.15%. Table 5 provides the reaction ingredients by weight percentage.

TABLE 11

Composition Added to the Reactor

| Compound | Percentage |
| --- | --- |
| $Ca(OH)_2$ | 25.73 |
| $H_2O_2$ | 11.91 |
| $CH_3COONa$ | 0.77 |
| Carrageenan | 2.52 |
| Water | 59.08 |

Table 6 provides the resulting product composition.

TABLE 12

Composition of the Products

| Compound | Percentage |
| --- | --- |
| $Ca(OH)_2O$ | 28.90 |
| $Ca(OH)_2$ | 2.09 |
| $CH_3COONa$ | 0.78 |
| Carrageenan | 2.53 |
| Water | 65.71 |

Example 3

The procedure of Example 1 was followed except for the amount of added carrageenan. In this example, 10.56 grams of carrageenan was added at the end of the reaction while the reactants were still at 40° C. The active oxygen content of this example was found to be 4.92%. Table 7 provides the reaction ingredients by weight percentage.

TABLE 13

Composition Added to the Reactor

| Compound | Percentage |
| --- | --- |
| $Ca(OH)_2$ | 25.10 |
| $H_2O_2$ | 11.62 |
| $CH_3COONa$ | 0.75 |
| Carrageenan | 4.91 |
| Water | 57.63 |

Table 8 provides the resulting product composition.

TABLE 14

Composition of the Products

| Compound | Percentage |
| --- | --- |
| $Ca(OH)_2O$ | 27.64 |
| $Ca(OH)_2$ | 2.52 |
| $CH_3COONa$ | 0.76 |
| Carrageenan | 4.94 |
| Water | 62.52 |

Example 4

The procedure of Example 1 was followed except for the amount of added carrageenan. In this example, 18.26 grams of carrageenan was added at the end of the reaction while the reactants were still at 40° C. The active oxygen content of this example was found to be 3.79%. At this level of carrageenan the product is not as smooth and has inclusions of consolidated product. Table 9 provides the reaction ingredients by weight percentage.

TABLE 15

Composition Added to the Reactor

| Compound | Percentage |
| --- | --- |
| $Ca(OH)_2$ | 24.23 |
| $H_2O_2$ | 11.22 |
| $CH_3COONa$ | 0.73 |
| Carrageenan | 8.19 |
| Water | 55.64 |

Table 10 provides the resulting product composition.

TABLE 16

Composition of the Products

| Compound | Percentage |
| --- | --- |
| $Ca(OH)_2O$ | 21.49 |
| $Ca(OH)_2$ | 6.93 |
| $CH_3COONa$ | 0.74 |
| Carrageenan | 8.32 |
| Water | 62.52 |

Example 5

A highly smooth gel product was made without the removal of water. To prepare a small amount of the gel, 54.0 grams of calcium hydroxide, $Ca(OH)_2$, was mixed with 3.25 grams of sodium acetate, $CH_3COONa$. Separately, 99 grams of water was placed in vessel with stirring. The mixture of calcium hydroxide and sodium acetate was slowly added to the vessel. The mixture was mixed until a uniform slurry was formed. A total of 50 grams of 50% by weight hydrogen peroxide, $H_2O_2$, was added slowly to the reaction vessel at a rate to maintain the reaction temperature of 40° C. Depending on ambient conditions and the temperature of the reagents, it may be necessary to add heat at the beginning of the reaction and remove heat after the reaction is in progress; if one desires to perform the reaction in the shortest time period, cooling will likely be required during the addition of $H_2O_2$. After the reaction was completed, as evidenced by no further heat generation after the addition of the last amount of $H_2O_2$, 2.11 grams of carrageenan was mixed into the reaction while it was still at 40° C. The resulting product was a smooth, moist mixture similar to thin "gelatine" with an active oxygen content of 5.35%. Table 11 provides the reaction ingredients by weight percentage.

TABLE 17

Composition Added to the Reactor

| Compound | Percentage |
| --- | --- |
| $Ca(OH)_2$ | 25.92 |
| $H_2O_2$ | 12.00 |
| $CH_3COONa$ | 1.56 |
| Carrageenan | 1.01 |
| Water | 59.51 |

Table 12 provides the product composition based on the active oxygen percentage and the assumption that the mixture reached equilibrium for all of the oxygen that was not lost from the reaction.

TABLE 18

Composition of the Products

| Compound | Percentage |
| --- | --- |
| $Ca(OH)_2O$ | 29.98 |
| $Ca(OH)_2$ | 1.35 |
| $CH_3COONa$ | 1.57 |
| Carrageenan | 1.02 |
| Water | 66.09 |

Example 6

The procedure of Example 5 was followed except for the amount of added sodium acetate. In this example, 4.86 grams of sodium acetate was added. The active oxygen content of this example was found to be 4.11%. Table 13 provides the reaction ingredients by weight percentage.

TABLE 19

Composition Added to the Reactor

| Compound | Percentage |
| --- | --- |
| $Ca(OH)_2$ | 25.72 |
| $H_2O_2$ | 11.91 |
| $CH_3COONa$ | 2.31 |
| Carrageenan | 1.00 |
| Water | 59.06 |

Table 14 provides the resulting product composition.

TABLE 20

Composition of the Products

| Compound | Percentage |
| --- | --- |
| $Ca(OH)_2O$ | 23.31 |
| $Ca(OH)_2$ | 6.84 |
| $CH_3COONa$ | 2.35 |
| Carrageenan | 1.02 |
| Water | 66.37 |

Example 7

A highly smooth gel product was made without the removal of water. To prepare a small amount of the gel, 54.0 grams of calcium hydroxide, $Ca(OH)_2$, was mixed with 1.62 grams of sodium acetate, $CH_3COONa$. Separately, 99 grams of water was placed in vessel with stirring. The mixture of calcium hydroxide and sodium acetate was slowly added to the vessel. The mixture was mixed until a uniform slurry was formed. A total of 50 grams of 50% by weight hydrogen peroxide, $H_2O_2$, was added slowly to the reaction vessel at a rate to maintain the reaction temperature of 40° C. Depending on ambient conditions and the temperature of the reagents, it may be necessary to add heat at the beginning of the reaction and remove heat after the reaction is in progress; if one desires to perform the reaction in the shortest time period, cooling will likely be required during the addition of $H_2O_2$. After the reaction was completed, as evidenced by no further heat generation after the addition of the last amount of $H_2O_2$, 5.56 grams of carrageenan was mixed into the reaction while it was still at 40° C. The resulting product was a smooth, moist gel with an active oxygen content of 5.59%. Table 15 provides the reaction ingredients by weight percentage.

TABLE 21

| Composition Added to the Reactor | |
| --- | --- |
| Compound | Percentage |
| $Ca(OH)_2$ | 25.69 |
| $H_2O_2$ | 11.89 |
| $CH_3COONa$ | 0.77 |
| Carrageenan | 2.65 |
| Water | 59.00 |

Table 16 provides the product composition based on the active oxygen percentage and the assumption that the mixture reached equilibrium for all of the oxygen that was not lost from the reaction.

TABLE 22

| Composition of the Products | |
| --- | --- |
| Compound | Percentage |
| $Ca(OH)_2O$ | 31.24 |
| $CH_3COONa$ | 0.77 |
| Carrageenan | 2.65 |
| Water | 65.30 |

Example 8

The procedure of Example 7 was followed except for the amount of added sodium acetate. In this example, 3.25 grams of sodium acetate was added. The active oxygen content of this example was found to be 5.28%. Table 17 provides the reaction ingredients by weight percentage.

TABLE 23

| Composition Added to the Reactor | |
| --- | --- |
| Compound | Percentage |
| $Ca(OH)_2$ | 25.49 |
| $H_2O_2$ | 11.80 |
| $CH_3COONa$ | 1.53 |
| Carrageenan | 2.62 |
| Water | 58.54 |

Table 18 provides the resulting product composition.

TABLE 24

| Composition of the Products | |
| --- | --- |
| Compound | Percentage |
| $Ca(OH)_2O$ | 29.58 |
| $Ca(OH)_2$ | 1.25 |
| $CH_3COONa$ | 1.54 |
| Carrageenan | 2.63 |
| Water | 65.00 |

Example 9

The procedure of Example 7 was followed except for the amount of added sodium acetate. In this example, 4.87 grams of sodium acetate was added. The active oxygen content of this example was found to be 5.23%. Table 19 provides the reaction ingredients by weight percentage.

TABLE 25

| Composition Added to the Reactor | |
| --- | --- |
| Compound | Percentage |
| $Ca(OH)_2$ | 25.30 |
| $H_2O_2$ | 11.71 |
| $CH_3COONa$ | 2.28 |
| Carrageenan | 2.61 |
| Water | 58.10 |

Table 20 provides the resulting product composition.

TABLE 26

| Composition of the Products | |
| --- | --- |
| Compound | Percentage |
| $Ca(OH)_2O$ | 29.30 |
| $Ca(OH)_2$ | 1.29 |
| $CH_3COONa$ | 2.29 |
| Carrageenan | 2.61 |
| Water | 64.51 |

Example 10

A highly smooth gel product was made without the removal of water. To prepare a small amount of the gel, 54.0 grams of calcium hydroxide, $Ca(OH)_2$, was mixed with 1.62 grams of potassium dihydrogen phosphate, $KH_2PO_4$. Separately, 99 grams of water was placed in vessel with stirring. The mixture of calcium hydroxide and potassium dihydrogen phosphate was slowly added to the vessel. The mixture was mixed until a uniform slurry was formed. A total of 50 grams of 50% by weight hydrogen peroxide, $H_2O_2$, was added slowly to the reaction vessel at a rate to maintain the reaction temperature of 40° C. Depending on ambient conditions and the temperature of the reagents, it may be necessary to add heat at the beginning of the reaction and remove heat after the reaction is in progress; if one desires to perform the reaction in the shortest time period, cooling will likely be required during the addition of $H_2O_2$. After the reaction was completed, as evidenced by no further heat generation after the addition of the last amount of $H_2O_2$, 2.11 grams of carrageenan was mixed into the reaction while it was still at 40° C. The resulting product was a smooth, moist gel with an active oxygen content of 4.96%. Table 21 provides the reaction ingredients by weight percentage.

TABLE 27

| Composition Added to the Reactor | |
| --- | --- |
| Compound | Percentage |
| $Ca(OH)_2$ | 26.12 |
| $H_2O_2$ | 12.09 |
| $KH_2PO_4$ | 0.78 |
| Carrageenan | 1.02 |
| Water | 59.98 |

Table 22 provides the product composition based on the active oxygen percentage and the assumption that the mixture reached equilibrium for all of the oxygen that was not lost from the reaction.

TABLE 28

Composition of the Products

| Compound | Percentage |
|---|---|
| Ca(OH)$_2$O | 27.90 |
| Ca(OH)$_2$ | 3.38 |
| KH$_2$PO$_4$ | 0.79 |
| Carrageenan | 1.03 |
| Water | 66.90 |

Example 11

The procedure of Example 10 was followed except for the amount of added carrageenan. In this example, 5.28 grams of carrageenan was added. The active oxygen content of this example was found to be 5.07%. Table 23 provides the reaction ingredients by weight percentage.

TABLE 29

Composition Added to the Reactor

| Compound | Percentage |
|---|---|
| Ca(OH)$_2$ | 25.73 |
| H$_2$O$_2$ | 11.91 |
| KH$_2$PO$_4$ | 0.77 |
| Carrageenan | 2.52 |
| Water | 59.08 |

Table 24 provides the resulting product composition.

TABLE 30

Composition of the Products

| Compound | Percentage |
|---|---|
| Ca(OH)$_2$O | 28.48 |
| Ca(OH)$_2$ | 2.46 |
| KH$_2$PO$_4$ | 0.78 |
| Carrageenan | 2.53 |
| Water | 65.76 |

Example 12

The procedure of Example 10 was followed except for the amount of added carrageenan. In this example, 10.56 grams of carrageenan was added. The active oxygen content of this example was found to be 5.16%. Table 5 provides the reaction ingredients by weight percentage.

TABLE 31

Composition Added to the Reactor

| Compound | Percentage |
|---|---|
| Ca(OH)$_2$ | 25.10 |
| H$_2$O$_2$ | 11.62 |
| KH$_2$PO$_4$ | 0.73 |
| Carrageenan | 8.33 |
| Water | 55.55 |

Table 26 provides the resulting product composition.

TABLE 32

Composition of the Products

| Compound | Percentage |
|---|---|
| Ca(OH)$_2$O | 28.84 |
| Ca(OH)$_2$ | 0.51 |
| KH$_2$PO$_4$ | 0.73 |
| Carrageenan | 8.35 |
| Water | 61.58 |

The above description is given by way of example, and not limitation. Given the above disclosure, one skilled in the art could devise variations that are within the scope and spirit of the invention disclosed herein, including the substitution of certain related reactants and their salts. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of producing a composition containing a metal peroxide capable of enhancing microbial degradation of contaminants in soil and groundwater, said method comprising:
   reacting a metal oxide or metal hydroxide with hydrogen peroxide in a solution of water containing a reaction moderator, intercalation agent, and a gelling agent;
   wherein the metal oxide or metal hydroxide is present in an amount from about 20% to about 30% by weight, the hydrogen peroxide is present in an amount from about 10% to about 15% by weight, the reaction moderator is present in an amount from about 0.5% to about 5% by weight, the intercalation agent is present in an amount from about 0.5% to about 5% by weight, the gelling agent is present in an amount from about 1% to about 20% by weight, and the water is present in an amount from about 40% to about 70% by weight.

2. The method of claim 1, wherein the composition is in a gel form.

3. The method of claim 1, wherein the composition is in a slurry form.

4. The method of claim 1, wherein the excess water is not removed after reacting the metal oxide or metal hydroxide with hydrogen peroxide.

5. The method of claim 1, wherein at least some excess water is removed after reacting the metal oxide or metal hydroxide with hydrogen peroxide.

6. The method of claim 5, wherein the excess water is removed by a spray drying process.

7. The method of claim 1, wherein the metal oxide is either CaO or MgO.

8. The method of claim 1, wherein the metal hydroxide is either Ca(OH)$_2$ or Mg(OH)$_2$.

9. The method of claim 1, wherein the hydrogen peroxide is introduced in an aqueous solution ranging from about 30% to about 70% by weight.

10. The method of claim 1, wherein the reaction moderator is a carboxylic acid.

11. The method of claim 1, wherein the reaction moderator is selected from the group consisting of acetic acid, formic acid, and propionic acid.

12. The method of claim 1, wherein the reaction moderator is a salt of a carboxylic acid.

13. The method of claim 12, wherein the reaction moderator is sodium acetate.

14. The method of claim 1, wherein the intercalation agent is a simple phosphate salt.

15. The method of claim 14, wherein the intercalation agent is selected from the group consisting of $KH_2PO_4$, $K_3PO_4$, $K_2HPO_4$, $NaH_2PO_4$, $Na_3PO_4$, and $Na_2HPO_4$.

16. The method of claim 1, wherein the gelling agent is selected from the group consisting of carrageenan, gelatin, ethyl cellulose, methyl cellulose, and xanthan gum.

17. A method of producing a composition containing a metal peroxide capable of enhancing microbial degradation of contaminants in soil and groundwater, said method comprising:

reacting a metal oxide or metal hydroxide with hydrogen peroxide in a solution of water containing a reaction moderator to form a first solution;

mixing the first solution with a gelling agent;

wherein the composition includes the metal oxide or metal hydroxide is present in an amount from about 20% to about 30% by weight, the hydrogen peroxide is present in an amount from about 10% to about 15% by weight, the reaction moderator is present in an amount from about 0.5% to about 5% by weight, the gelling agent is present in an amount from about 1% to about 20% by weight, and the water is present in an amount from about 40% to about 70% by weight.

18. The method of claim 17, wherein the first solution is further mixed with an intercalation agent, said intercalation agent being present in the composition in an amount from about 0.5% to about 5% by weight.

19. The method of claim 17, wherein at least some excess water is removed after reacting the metal oxide or metal hydroxide with hydrogen peroxide and the reaction moderator.

* * * * *